US006446122B1

(12) United States Patent
Rawat et al.

(10) Patent No.: US 6,446,122 B1
(45) Date of Patent: *Sep. 3, 2002

(54) METHOD AND APPARATUS FOR COMMUNICATING QUALITY OF SERVICE INFORMATION AMONG COMPUTER COMMUNICATION DEVICES

(75) Inventors: Vipin Rawat, Sunnyvale; David Langley, Los Gatos, both of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,755

(22) Filed: Jun. 24, 1998

(51) Int. Cl.[7] .......................... G06F 15/173; H04L 12/28
(52) U.S. Cl. ....................................................... 709/224
(58) Field of Search ................................. 709/224, 228, 709/231, 232, 236, 240, 103; 370/252, 351, 471, 474, 476, 207, 395, 60, 410; 714/47

(56) References Cited

U.S. PATENT DOCUMENTS

| 5,251,205 A | | 10/1993 | Callon et al. | |
| 5,394,402 A | | 2/1995 | Ross | |
| 5,416,771 A | * | 5/1995 | Iwata | ........................... 370/60 |

(List continued on next page.)

OTHER PUBLICATIONS

Frame Relay Technology Overview, Cisco System, http://www.lr.ttu.ee~/araja/sidealused/FR~1.HTM, 10 pages, Apr. 1999.*

American National Standards Institute, Inc., Integrated Services Digital Network (ISDN)—Signaling Specification for Frame Relay Bearer Service for Digital Subscriber Signaling System No. 1 (DSS1), Oct. 24, 1991.

Digital Equipment Corporation, Northern Telecom, Inc., Stratacom, Inc., Frame Relay Specification with Extensions, Sep. 18, 1990.

International Telegraph and Telephone Consultative Committee, Study Group XI—Report R 240, Apr. 1992.

Smith, Frame Relay Principles and Applications, 1993, pp. 27–93 and pp. 128–169, Addison Wesley, New York.

*Primary Examiner*—Robert B. Harrell
*Assistant Examiner*—Bunjob Jaroenchonwanit
(74) *Attorney, Agent, or Firm*—Innovation Partners; Charles E. Gotlieb

(57) ABSTRACT

A method and apparatus allows a switch or other network equipment device to provide Quality of Service information to a router or other user equipment devices using a management interface such as frame relay LMI. The switch and router negotiate the version of the management interface that has the capabilities of the present invention. The router can then request Quality of Service parameters from the switch. The switch provides the parameters and the router can use them to route information via the switch. If the parameters are changed in the switch or other changes occur, the switch notifies the router and the router can then request updated parameters from the switch.

37 Claims, 3 Drawing Sheets

U.S. PATENT DOCUMENTS

| | | | | | |
|---|---|---|---|---|---|
| 5,461,611 | A | * | 10/1995 | Drake, Jr. et al. | 370/54 |
| 5,490,141 | A | * | 2/1996 | Lai et al. | 370/60.1 |
| 5,515,363 | A | * | 5/1996 | Ben-Nun et al. | 370/17 |
| 5,533,009 | A | * | 7/1996 | Chenj | 370/17 |
| 5,600,820 | A | * | 2/1997 | Johnston | 395/497.02 |
| 5,633,869 | A | | 5/1997 | Burnett et al. | |
| 5,678,006 | A | | 10/1997 | Valizadeh et al. | |
| 5,742,772 | A | * | 4/1998 | Sreenam | 709/226 |
| 5,774,656 | A | * | 6/1998 | Hattori et al. | 709/223 |
| 5,802,042 | A | * | 9/1998 | Natarajan et al. | 370/252 |
| 5,850,388 | A | * | 12/1998 | Anderson et al. | 370/252 |
| 5,884,043 | A | * | 3/1999 | Teplitsky | 709/238 |
| 5,892,754 | A | * | 4/1999 | Kompella et al. | 370/236 |
| 5,898,668 | A | * | 4/1999 | Shaffer | 370/230 |
| 5,925,104 | A | * | 7/1999 | Elberts et al. | 709/231 |
| 5,933,425 | A | * | 8/1999 | Iwata | 370/351 |
| 5,935,213 | A | * | 8/1999 | Rannand et al. | 709/234 |
| 5,940,368 | A | * | 8/1999 | Takamichi | 370/229 |
| 5,946,311 | A | * | 8/1999 | Alexander, Jr. et al. | 370/395 |
| 5,948,065 | A | * | 9/1999 | Eilert et al. | 709/226 |
| 5,953,338 | A | * | 9/1999 | Ma et al. | 370/395 |
| 5,958,009 | A | * | 9/1999 | Friedrich et al. | 709/224 |
| 5,963,541 | A | * | 10/1999 | Koga | 370/229 |
| 5,966,163 | A | * | 10/1999 | Lin et al. | 348/12 |
| 5,970,229 | A | * | 10/1999 | Thomas et al. | 709/212 |
| 5,995,503 | A | * | 11/1999 | Crawley et al. | 370/351 |
| 6,005,866 | A | * | 12/1999 | Lincoln | 370/398 |
| 6,008,805 | A | * | 12/1999 | Land et al. | 345/335 |
| 6,021,263 | A | * | 2/2000 | Kujoory et al. | 709/232 |
| 6,058,102 | A | * | 5/2000 | Drysdale et al. | 370/252 |
| 6,144,669 | A | * | 11/2000 | Williams et al. | 370/401 |
| 6,252,857 | B1 | * | 6/2001 | Fendick et al. | 370/254 |
| 6,304,546 | B1 | * | 10/2001 | Natarajan et al. | 370/216 |

* cited by examiner

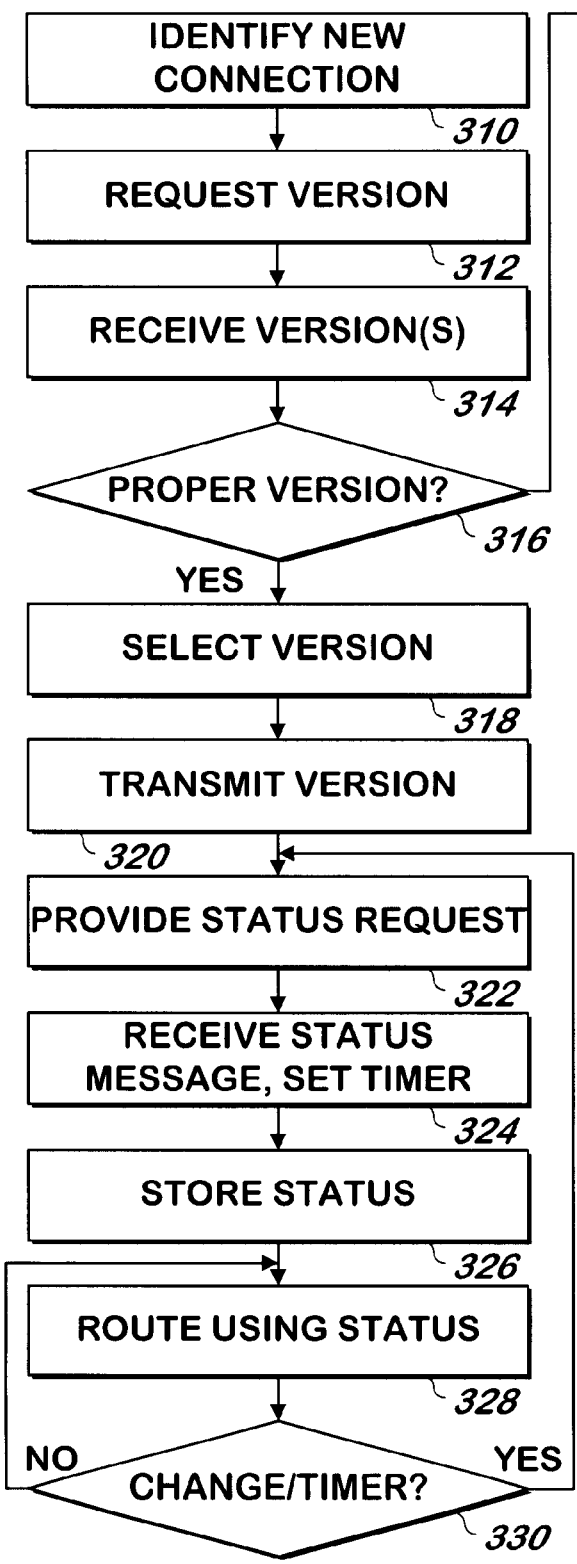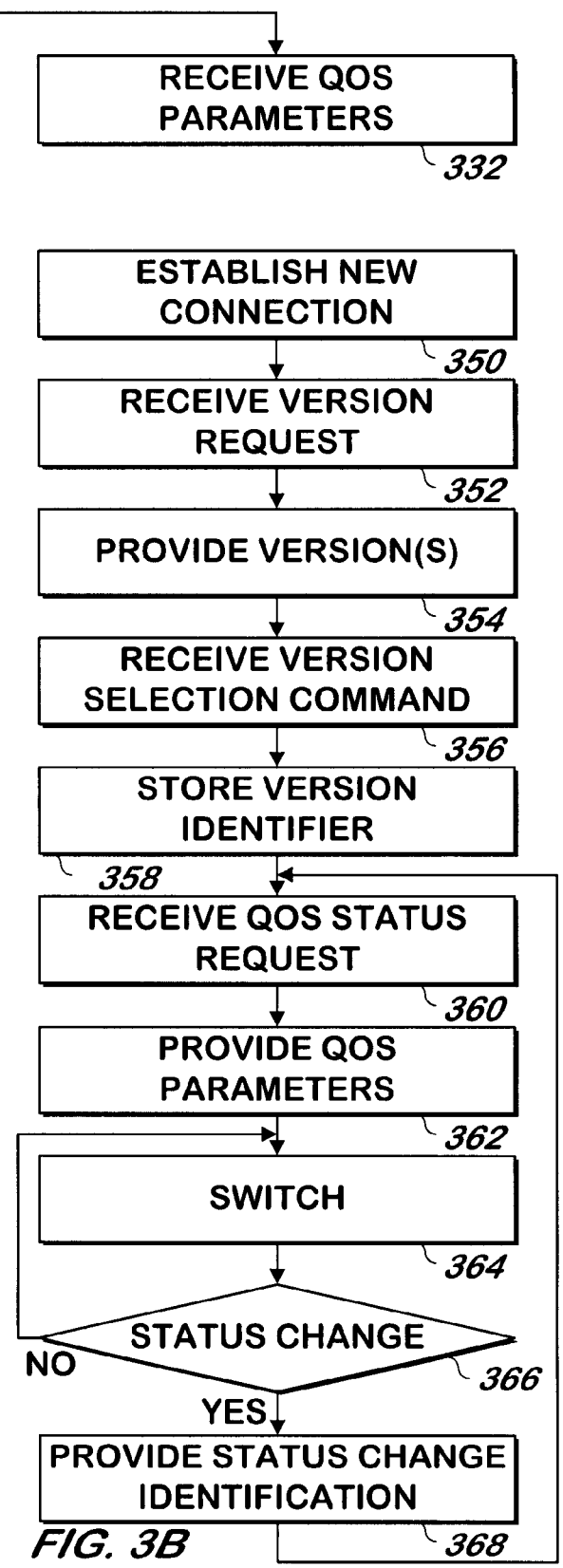

METHOD AND APPARATUS FOR COMMUNICATING QUALITY OF SERVICE INFORMATION AMONG COMPUTER COMMUNICATION DEVICES

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is related to computer software and more specifically to management software for computer networking equipment.

BACKGROUND OF THE INVENTION

Moving information between two points may involve several computer networks. To send data to a remote site, the data may be sent to a router coupled to the sender's network, sent over a network service provider's network, and received by a router at the recipient's network.

In many cases, the network service provider is a company distinct from the sender or the recipient, such as a telephone company, that provides communication and switching services to the sender and recipient. The routers at the sender and recipient communicate with switches operated by or for the network service provider.

If the network service provider's network is an ATM network or frame relay network, information may be moved through the use of virtual circuits. A virtual circuit defines a path between two points of a network, and a physical data link may be used to carry the information from multiple virtual circuits.

The user of a network service provider pays for service meeting certain parameters which define a Quality of Service for the virtual circuit between the sender's router and the network service provider's switch. If the network operated by the network service provider is a frame relay network, these parameters may include one or more of a committed information rate (CIR), committed burst size (Bc), excess burst size (Be), maximum frame size, or priority. The network service provider configures its network to provide service to the user that meets these parameters. One way of configuring the network is by communicating these parameters to one or more of the switches that make up the network service provider's network. Software in the switch attempts to ensure that sufficient capacity exists to meet the requirements defined by the parameters, and attempts to supply up to this capacity as the data received by the router requires.

If the sender supplies data via a virtual circuit to the network service provider's network that exceeds the Quality of Service for such link for which the user has paid, the response by the network may be uncertain. Therefore, for each virtual circuit the user maintains to the network service provider's switch, the sender will attempt to keep the level of data it sends within the Quality of Service for which it has contracted. Because the sender's router supplies data to the network service provider's network, the sender will configure its routers to prevent them from exceeding the Quality of Service provided by the network virtual circuits.

To configure the switches of the network service provider, the network service provider supplies the Quality of Service parameters to one or more of its switches. To configure the router, the sender must supply the Quality of Service parameters to its routers.

Supplying Quality of Service parameters to routers can be a time-consuming and error-prone task. Each router requires certain Quality of Service parameters for each connection in the network. If a Quality of Service parameter for a virtual circuit does not match that of the switch with which the router communicates, either the router will overload the switch with uncertain results, or the router will underutilize the switch, wasting capability for which the user is paying. If the parameters are changed in the switch, the parameters in the router must also be updated to match, resulting in another time-consuming and error-prone task that can cause the same problems described above if not performed properly.

What is desired are a method and apparatus that ensures the Quality of Service parameters in the switch match the Quality of Service parameters in the router and reduces the effort involved in communicating such parameters. Because of the large installed base of switches and routers, it is desirable that the method and apparatus implemented on a switch operate with routers that do not utilize such method or apparatus, and the method and apparatus implemented on a router operate with switches that do not utilize such method or apparatus.

SUMMARY OF INVENTION

A method and apparatus allows Quality of Service parameters to be received by a router or other user equipment devices from a switch or other network equipment device, thereby eliminating the duplicate entry of such parameters to the router and ensuring the parameters in the router match those of the switch. When a new connection is established between the switch and the router, the switch can request the router to send either a list of available protocols or an indication of whether it can support the features of the present invention. If the router detects a protocol that provides the other features of the present invention, the router instructs the switch, either implicitly or explicitly, to communicate using that protocol. The router can then request the switch to send the Quality of Service parameters it has for various virtual circuits. The router can then use the parameters received from the switch for conventional routing operations. In the event that the switch changes its parameters or adds parameters for a new physical or logical connection, the switch informs the router of the change. The router can then request the switch to resend its parameters. The method and apparatus allows the parameters in the router to match the parameters in the switch while reducing the effort to maintain these parameters in the router in a manner that allows equipment to be compatible with other equipment that does not implement the method and apparatus described herein.

BRIEF DESCRIPTION OF THE DRAWINGS

FIG. 3A is a flowchart illustrating a method of receiving Quality of Service parameters according to one embodiment of the present invention.

FIG. 3B is a flowchart illustrating a method of providing Quality of Service parameters according to one embodiment of the present invention.

DETAILED DESCRIPTION OF A PREFERRED EMBODIMENT

Figure 1:
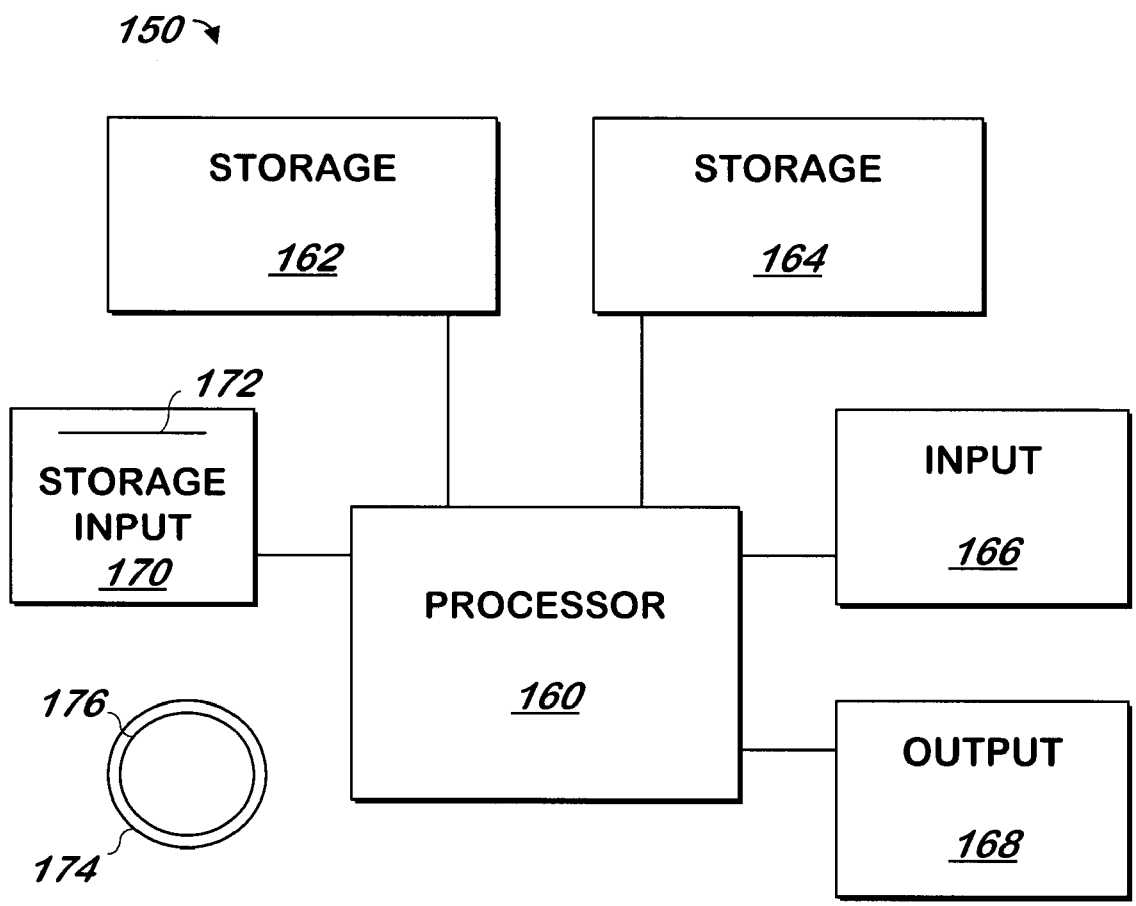
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may. provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, the switch and the router are each conventional computer systems 150 such as a conventional Pentium II-compatible microcomputer running the Windows 95 operating system commercially available from Microsoft Corporation of Redmond, Wash., along with suitable communication interfaces and software, although other systems may be used.

Figure 2:
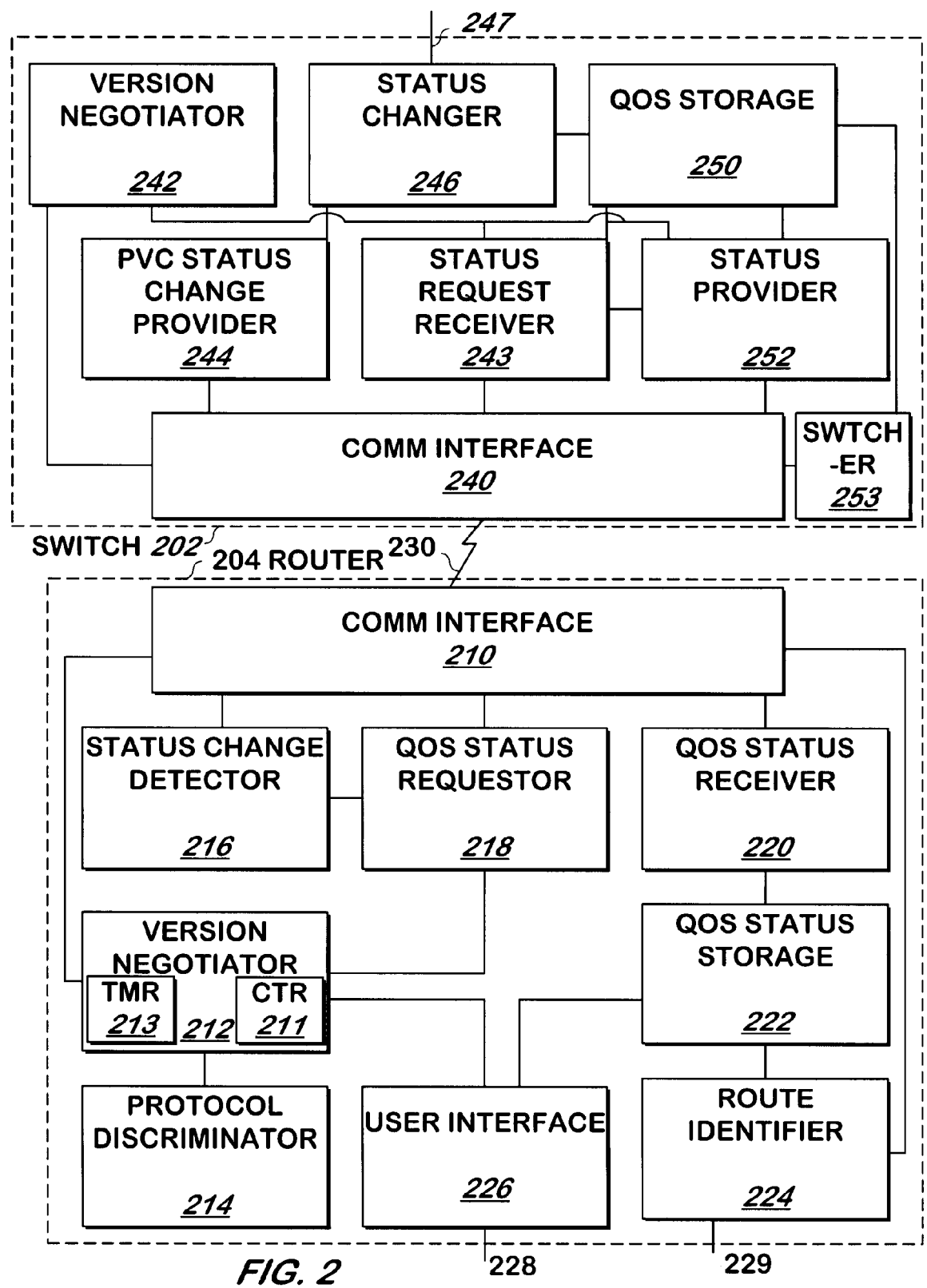
FIG. 2 is a block schematic diagram of a switch and a router that can communicate Quality of Service parameters according to one embodiment of the present invention.

Referring now to FIG. 2, a switch and a router are shown according to one embodiment of the present invention. Switch 202 can be a conventional network switch, or any other network equipment device, enhanced as described herein. As used herein, a "network equipment device" is a piece of equipment such as a switch, that supplies wide area network service. Communication interface 240, quality of service storage 250 and switcher 253 perform all the functions of a conventional switch. Communications interface 240 communicates with other switches or other network equipment and routers. Quality of Service storage 250 stores the Quality of Service parameters described above. Switcher 253 controls conventional switching functions.

Router 204 can be a conventional user router, conventional user bridge, or any other user equipment device, enhanced as described herein. As used herein, a "user equipment device" is a piece of equipment such as a router or bridge that allows computer equipment, which may be connected to a local network, to communicate with a wide area network, such as that used by a network service provider. Communications interface 210, route identifier 224, user interface 226 and Quality of Service status storage 222, described in more detail below, perform the functions of a conventional router. Switch 202 communicates with router 204 via communications line 230 and conventional communications interfaces 210, 240 which perform conventional communications functions between a convention switch and a conventional router. Communications line 230 may consist of one or more virtual circuits. A virtual circuit may be transported over any physical connection made between the switch 202 and the router 204. In one embodiment, switch 202 and router 204 communicate using the conventional frame relay LMI protocol, although other protocols may be used by the present invention. The conventional frame relay LMI protocol is described in Smith, *Frame Relay Principles and Applications* (1994 Addison Wesly)In one embodiment, virtual circuits are numbered, and virtual circuit number zero is used for communication using the LMI protocol, although other virtual circuit numbers may be used.

When a data link is established between switch 202 and router 204 communications interfaces 240, 210 detect the link or connection. When communications interface 210 detects the connection, communications interface 210 signals version negotiator 212. Version negotiator 212 produces and sends to communication interface 210 a version status enquiry message, described in more detail below. Communication interface 210 receives the version status enquiry message and transmits it to communication interface 240 via communication line 230. Communication interface 240 receives the version status enquiry message and provides it to version negotiator 242.

If switch 202 has the capability, version negotiator 242 provides the version of the local management interface or other similar communication management interface software used to transmit information to router 204. Version negotiator 242 builds a version status message described in more detail below, and provides it to communication interface 240. Communication interface 240 transmits the version status message via communication line 230 to communication interface 210. Communication interface 210 provides the version status message to version negotiator 212.

Version negotiator 212 provides the version status message to protocol discriminator 214. Protocol discriminator 214 identifies from the version status message received whether Quality of Service status messages may be requested and received from the switch 202. In one embodiment, A version status message may include various identifiers of various versions of the protocol supported by the switch 202. If one of the versions supported by the switch 202 supports Quality of Service status messages, protocol discriminator 214 selects such version and provides an indicator of the version selected to version negotiator 212. Version negotiator 212 provides to communication interface 210 a version selection message. Communication interface 210 transmits the version selection command via communication line 230 to communication interface 240. Communication interface 240 provides the version selection command to version negotiator 242. Version negotiator 242 stores an indicator of the version. to be used when communicating using the interface 240 over which the version selection command is received. In one embodiment, the version selection message is communicated as part of one or more of the Quality of Service status enquiry messages described in more detail below.

If switch 202 does not support the present invention, switch 202 will not respond or will not respond properly to the version status request. In one embodiment, router 204 will repeat the procedure described above a configurable number of times such as twice if no response to the version status request is detected within a configurable amount of time such as twenty seconds. Version negotiator 212 sets timer 213 to detect such period and uses counter 211 to identify the number of retries completed.

In such event, router 204 will select a protocol that does not support the present invention and will not perform the steps described herein that retrieve Quality of Service parameters from switch 202 and version negotiator 212 stores this protocol. Instead, version negotiator 212 prompts user interface 226 to request via conventional display coupled to input/output 228 or otherwise accept Quality of Service parameters from a user input device such as a conventional keyboard and mouse coupled to input/output 228.

In one embodiment, version negotiator 212 sets timer 213 for a configurable period such as ten minutes, and repeats the version negotiation described above when the timer 213 period has elapsed. If the switch 202 or router 204 receives a new version of a management protocol, it will be detected upon this periodic renegotiation.

If a version of the local management interface used by switch 202 does support Quality of Service status messages, version negotiator 212 stores this information, and signals Quality of Service status requester 218.

Quality of service status requester 218 builds a Quality of Service status enquiry message described in more detail below, and transmits it to status request receiver 243 via communication interfaces 210, 240 and communication line 230. The Quality of Service status enquiry message can specify one or more virtual circuits for which status is requested. Status request receiver 243 passes the Quality of Service status enquiry message to status provider 252. Status provider 252 retrieves from Quality of Service storage 250 the frame relay Quality of Service parameters, such as committed information rate (CIR), committed burst size (Bc), excess burst size (Be), maximum frame size, or priority, associated with the one or more virtual circuits specified and provides to communication interface 240 a Quality of Service status message, described in more detail below, containing this information.

Communication interface 240 transmits the Quality of Service status message to communication interface 210, which provides it to Quality of Service status receiver 220. Quality of service status receiver 220 stores the Quality of Service parameter information contained in the status message it receives into Quality of Service status storage 222. Quality of Service status storage is used by route identifier 224 to route information using conventional routing methods.

If a change to a Quality of Service parameter is desired on switch 202, status changer 246 receives the change at input 247, for example from a conventional keyboard and mouse or other device. Status changer 246 stores the change into Quality of Service storage 250 in place of any former value of the parameter. Status changer 246 signals status change provider 244, which provides to communication interface 240 a full status message. In one embodiment, a full status message is a conventional frame relay LMI full status message, modified as described below, and includes an identifier of the one or more virtual circuits for which status has changed.

Communication interface 240 transmits the full status message to communication interface 210 via communication line 230. Communication interface 210 provides the full status message to status change detector 216. Status change detector 216 signals Quality of Service status requester 218 upon receipt of full status message. Quality of Service status requester 218 requests from version negotiator 212 whether the protocol in use supports Quality of Service status requests. If such status requests are supported by the protocol negotiated as described above, Quality of Service status requester builds and provides a Quality of Service status inquiry as described above. The switch 202 communicates, and router 204 receives and stores for use in routing, the Quality of Service status via a Quality of Service Status message as described above for the virtual circuit identified by the full status message.

Switcher 253 performs conventional switching functions using quality of service parameters stored in Quality of Service storage 250 via communication-interface 240. Route identifier 224 performs conventional router or bridging functions receiving data from the users network at input/output 229 and passing it to communication interface 210 using the parameters stored in Quality of Service storage 222. Data received from the network equipment device intended for the user network is provided by route identifier 224 to the user network via input/output 224.

Referring now to FIG. 3A, a method of receiving Quality of Service parameters used to route information is shown according to one embodiment of the present invention. In one embodiment, the steps of FIG. 3A are performed by a user equipment device, such as a conventional router or bridge, modified to perform the method described below, although the steps may be performed by other equipment is well.

If a new connection is established, it is identified 310. In response to the identification of the new connection, an identifier of a management interface protocol of a switch, such as a version and type of frame relay LMI, is requested from the switch 312. In one embodiment, the request is performed by transmitting a version status inquiry message described in more detail below. In one embodiment, a management interface protocol such as frame relay LMI is identified by a version, and this version is requested as a part of step 312. The version or other identifier of the protocol is received 314. In one embodiment, step 314 may consist of receiving several versions of management interface protocols supported by the switch to which the request in step 312 was sent. In another embodiment, step 314 consists of receiving an identifier of whether "enhanced" LMI is supported. Enhanced LMI is supported if the switch supports providing Quality of Service information as described herein.

If the version or at least one of the versions received in step 314 can support the transmission of status requests for Quality of Service parameters 316, a version that can support such request is selected 318 from the versions received in step 314. In one embodiment, step 316 may be performed by consulting a lookup table of versions or comparing the versions with a first version number that will support Quality of Service status enquiry messages, and selecting the latest such version. In another embodiment, step 316 is performed by examining a bit or other indicator in the response indicating support of enhanced LMI is provided.

An indication of the version selected in step 318 is transmitted 320 to instruct the switch that such version is to be used to perform management functions. In one embodiment, step 320 is performed by transmitting one or more messages that are only applicable to the enhanced LMI protocol described in more detail below. Such embodiment may be used where the difference between original LMI and enhanced LMI to the recipient of the transmission performed in step 320 is in receiving messages and responding to them, but not initiating any such messages until after an enhanced LMI message has been received.

In another embodiment, step 320 may be performed by providing an identifier of a type of protocol and a version number. For example, rather than selecting a particular version, an identifier corresponding to "any version of enhanced LMI" may be provided. In one embodiment, step 320 is provided as a part of step 322, described in more detail below. This means the identifier of the protocol may be transmitted at more than one repetition of step 322 following step 330 as described in more detail below.

A status request is provided 322. The status request may be a Quality of Service status enquiry message, described in more detail below. A Quality of Service status message, such as that described in more detail below, is received 324 in response to the status requested in step 322. In one embodiment, a timer is set to set an alarm in ten minutes as part of step 324.

Some or all of the status received in step 324 is stored 326. The status stored in step 326 is used to perform 328 conventional functions performed by conventional user equipment devices, such as routing, bridging or other functions.

If no version received in step 314 can perform the status requests described in more detailed below 316, Quality of Service parameters may be received 332, for example manually from a user.

In one embodiment, full status messages may be received. If the full status message is not received 330, the routing or other functions performed in step 328 are performed. If a full status message is received 330, the method continues at step 322. Additionally, if the timer set in step 324 elapses, the method continues at step 330. In one embodiment, routing functions performed in step 328 are performed in parallel with steps 322–326 and 330.

Referring now to FIG. 3B, a method of providing Quality of Service parameters is shown according to one embodiment of the present invention. The steps shown in FIG. 3B may be performed by a network equipment device such as a switch, although the steps in FIG. 3B may be performed by other devices as well.

A new connection may be established as described above 350. A version status enquiry message described above may be received 352. A version status message as described in more detail below and including one or more versions identifiers of any management interfaces supported may be provided 354. In one embodiment, several identifiers corresponding to several versions of the management interface supported are provided in step 354.

In such embodiment, a version selection command may be received 356 specifying one or more of the versions provided in step 354. In another embodiment, the version status message provided in step 354 indicates enhanced LMI, and step 356 involves receiving a command that is only used with enhanced LMI. For example, the version selection command may be received as a Quality of Service status request as part of step 360, causing receipt of the version selection command to be a part of the loop of steps 360–368. The fact that the Quality of Service Status message is sent at all indicates that enhanced LMI should be used, because such a message will only be used when communicating using enhanced LMI. The version or versions selected in step 356 are stored 358 so that they may be used to perform management functions.

A Quality of Service status enquiry message is received 360. In response to this request, Quality of Service parameters described above are provided 362, for example using a Quality of Service status message described in more detail below. The Quality of Service parameters provided in step 362 may be used to perform functions such as conventional switching functions 364. If a full status is detected 366, a full status message described in more detail below may be provided 368, and the method continues at step 360. In one embodiment, switching functions performed as part of step 364 will continue following step 366 in parallel with steps 360–362.

The method and apparatus of the present invention may communicate status enquiry messages, full status messages and status messages using any format. Below are described one format of such messages according to one embodiment of the present invention.

Five types of messages may be sent as described above. User equipment devices send version status enquiry and Quality of Service status enquiry messages, and network equipment devices send version status, full status and Quality of Service status messages.

Four of the five messages (all but full status messages) contain a first set of nine or ten octets that have similar information in each message. Those octets are described in Table 1 listed below.

TABLE 1

| Octet | Description |
| --- | --- |
| 1–2 | Data Link Connection Identifier (DLCI)-a unique identifier of the virtual circuit. Although support for greater-than-two-octet DLCIs is not expressed in this embodiment, other embodiments of Table 1 can use other numbers of octets of DLCIs. |
| 3 | Conventional LMI unnumbered frame identifier (0 × 03). |
| 4 | Conventional LMI protocol discriminator: (0 × 09) for Cisco LMI (also referred to as "Group of Four" LMI), (0 × 08) for ANSI or ITU LMI. |
| 5 | Conventional LMI call reference (0 × 00). Conventional LMI message type: (0 × 75 = status inquiry, for version and QoS (Quality of Service) status enquiry requests; 0 × 7D = status, for version status and QoS status). |
| 6 Opt | In ANSI LMI, this octet contains a locking shift character (0 × 95), and in Cisco LMI and ITU LMI, this octet is not present. |
| 7 | Report Type Information Element Identifier (0 × 01 for ANSI LMI and Cisco LMI; 0 × 51 for ITU LMI). |
| 8 | Length in octets of the octet following this one, which is always 0 × 01. |
| 9 | Conventional LMI report type (0 × 08 for version status request and version status messages, 0 × 09 for QoS status request and status messages). |

The remaining octets for each message are as follows: For a version status request message, Table 2 describes octets 10–72 (for Cisco LMI and ITU LMI) or 11–73 (for ANSI LMI), which form a version type information indentifier, or version type IE. The values are those of the sender.

TABLE 2

| | |
| --- | --- |
| 1 | Version type IE identifier (0 × 09) |
| 2 | Number of octets of that version type IE after octet 2 of that version type IE, up to and including the last octet of that version type IE. (61) |
| 3 | Version type: bit 1 indicates ITU LMI (Q.933) is supported if set, bit 2 indicates ANSI LMI (T1-617) is supported if set, bit 3 indicates Cisco LMI is supported if set, bits 4-7 indicate the version number of the LMI (0000 for original LMI and 0001 for enhanced LMI capable of operating as described herein), and bit 8 is zero. |

TABLE 2-continued

| | |
|---|---|
| 4–18 | ASCII code for the device vendor name, padded to 15 characters by 0 × 20, the ASCII space character, e.g. "cisco          ". Bit 8 in all octets is zero. |
| 19–33 | ASCII code for the device platform name, padded to 15 characters by 0 × 20, the ASCII space character, e.g. "AS5200          ". Bit 8 in all octets is zero. |
| 34–48 | ASCII code for the device name, padded to 15 characters by 0 × 20, the ASCII space character, e.g. "router          ". Bit 8 in all octets is zero. |
| 49–63 | Reserved. Bit 8 in all octets is zero, except in the last octet, in which bit 8 is 1. |

For a version status message, octets 10–72 (Cisco LMI and ITU LMI) or 11–73 (ANSI LMI) are the same as in Table 2 except that the values are those of the sender of the version status message.

Octets after the first set of nine (Cisco LMI and ITU LMI) or ten (ANSI LMI) octets in a Quality of Service status enquiry message contain one or more Data Link Connection Identifier information elements, or DLCI IEs. A DLDI IE is described in Table 3. The DLCI IE is specified in ITU LMI specification Q.933 for SVCs, and is used in this embodiment for PVCs. Multiple DLCI IEs may be specified in a single message if status for multiple DLCIs is being requested.

TABLE 3

| Octet | Description |
|---|---|
| 1 | 0 × 19, to identify the information element as a DLCI IE. |
| 2 | Length in number of bytes following octet 2 in that DLCI IE. |
| 3 | Bits 1–6 contain the most significant bits of the DLCI, bit 7 is reserved and bit 8 is 0. |
| 4 | Bits 1–3 are reserved, bits 4–7 contain the second most significant DLCI bits, and bit 8 is 0 if the DLCI requires more than 10 bits, 1 otherwise. Cisco Systems, Inc., supports 10 bit DLCIs. |
| 5 | If DLCI requires no more than 16 bits, bit 1 is reserved, bits 2–7 are the third most significant DLCI bits and bit 8 is 1. If DLCI requires more than 16 bits, bits 1–7 contain the third most significant bits and bit 8 is zero. If DLCI requires 10 bits or less, this octet is not present. |
| 6 | If DLCI requires more than 16 bits, bit 1 is reserved, bits 2–7 are the fourth most significant DLCI bits and bit 8 is 1, otherwise, this octet is not present. |

Octets beyond the first nine (Cisco LMI and ITU LMI) or ten (ANSI LMI) octets of a Quality of Service status message contain Quality of Service information elements, or QoS IEs, for each DLCI requested by the Quality of Service status message. There may be multiple QoS IEs appended to the first set of octets described above,

TABLE 4

| | |
|---|---|
| 1 | 0 × 48, to identify the IE as a QoS IE. |
| 2 | Length in number of bytes following this octet of this QOS Information Element until and including the last octet of this Information Element. |
| 3 | Bits 1–6 contain the most significant bits of the DLCI, bit 7 is reserved and bit 8 is 0. |
| 4 | Bits 1–3 are reserved, bits 4–7 contain the second most significant DLCI bits, and bit 8 is 0 if the DLCI requires more than 10 bits, 1 otherwise. Cisco Systems, Inc., supports 10 bit DLCIs. |

TABLE 4-continued

| | |
|---|---|
| 5 | If DLCI requires no more than 16 bits, bit 1 is reserved, bits 2–7 are the third most significant DLCI bits and bit 8 is 1. If DLCI requires more than 16 bits, bits 1–7 contain the third most significant bits and bit 8 is zero. If DLCI requires 10 bits or less, this octet is not present. |
| 6 | If DLCI requires more than 16 bits, bit 1 is reserved, bits 2–7 are the fourth most significant DLCI bits and bit 8 is 1, otherwise, this octet is not present. |
| 7 | 0 × 09, maximum Frame Mode Info Field (FMIF) size field identifier. |
| 8 | Bits 1–7 are the most significant 7 bits of the outgoing (DTE to Switch) maximum FMIF Size and bit 8 is 0 if maximum FMIF is asymmetrical. Otherwise, bits 1–7 are the most significant 7 bits of the maximum FMIF Size and bit 8 is 0. |
| 9 | Bits 1–7 are the least significant 7 bits of the outgoing (DTE to Switch) maximum FMIF Size and bit 8 is 0 if maximum FMIF is asymmetrical. Otherwise, bits 1–7 are the least significant 7 bits of the maximum FMIF Size and bit 8 is 1. |
| 10 | Bits 1–7 are the most significant 7 bits of the incoming (Switch to DTE) maximum FMIF Size and bit 8 is 0 if maximum FMIF is asymmetrical. Otherwise, this octet is not present. |
| 11 | Bits 1–7 are the least significant 7 bits of the incoming (Switch to DTE) maximum FMIF Size and bit 8 is 1 if maximum FMIF is asymmetrical. Otherwise, this octet is not present. |
| 12 | 0 × 0A, Committed information rate field identifier. |
| 13 | Bits 1–4 are the four most significant bits of the multiplier P of the outgoing CIR, and bits 5–7 are the magnitude G of the outgoing CIR, where the CIR = P*10**G, if the CIR is asymmetrical. Bits 1–4 are the four most significant bits of the multiplier P of the CIR and bits 5–7 are the magnitude G of the CIR, where the CIR = P*10**G, if the CIR is symmetrical. Note that p should not be evenly divisible by 10, and G can have values 0–6, but not 7. Bit 8 is 0. |
| 14 | Bits 1–7 are the seven least significant bits of the multiplier of the preceding octet, and bit 8 is zero if the CIR is asymmetrical and 1 otherwise. |
| 15 | Bits 1–4 are the four most significant bits of the multiplier P of the incoming CIR, and bits 5–7 are the magnitude G of the incoming CIR, where the CIR = P*10**G, if the CIR is asymmetrical. Note that p should not be evenly divisible by 10, and G can have values 0–6, but not 7. This octet is not included if the CIR is symmetrical. If the CIR is asymmetrical, but the incoming CIR is unknown, bits 1–7 are 1 and bit 8 is 0. |
| 16 | Bits 1–7 are the seven least significant bits of the multiplier of the preceding octet, and bit 8 is 1 if the CIR is symmetrical. This octet is not included if the CIR is symmetrical. If the CIR is asymmetrical, but the incoming CIR is unknown, bits 1–8 are 1. |
| 17 | 0 × 0D, Committed burst size field identifier |
| 18 | Bits 1–7 are the seven most significant bits of the value of the outgoing committed burst size if the committed burst size is asymmetric and are the seven most significant bits of the value of the committed burst size if the committed burst size is symmetric. Bit 8 is 0. |
| 19 | Bits 1–7 are the seven least significant bits of the value of the outgoing committed burst size and bit 8 is 0 if the committed burst size is asymmetric. Bits 1–7 are the seven least significant bits of the value of the committed burst size and bit 8 is 1 if the committed burst size is symmetric. |
| 20 | Bits 1–7 are the seven most significant bits of the value of the incoming committed burst size and bit 8 is 0 if the committed burst size is asymmetric. This octet is not included if the committed burst size is symmetric. |

TABLE 4-continued

| | |
|---|---|
| 21 | Bits 1–7 are the seven least significant bits of the value of the incoming committed burst size and bit 8 is 1 if the committed burst size is asymmetric. This octet is not included if the committed burst size is symmetric. |
| 22 | 0 × 0F, Excess burst size field identifier |
| 23 | Bits 1–7 are the seven most significant bits of the value of the outgoing excess burst size if the excess burst size is asymmetric and are the seven least significant bits of the value of the excess burst size if the excess burst size is symmetric. Bit 8 is 0. |
| 24 | Bits 1–7 are the seven least significant bits of the value of the outgoing excess burst size and bit 8 is 0 if the excess burst size is asymmetric. Bits 1–7 are the seven least significant bits of the value of the excess burst size and bit 8 is 1 if the excess burst size is symmetric. |
| 25 | Bits 1–7 are the seven most significant bits of the value of the incoming excess burst size and bit 8 is 0 if the excess burst size is asymmetric. This octet is not included if the excess burst size is symmetric. |
| 26 | Bits 1–7 are the seven least significant bits of the value of the incoming excess burst size and bit 8 is 1 if the excess burst size is asymmetric. This octet is not included if the excess burst size is symmetric. |
| 27 | 0 × 0F, priority field identifier. |
| 28 | Bits 1–7 are the priority of the DLCI and bit 8 is 1. |
| 29 | 0 × 10, Committed burst size magnitude field identifier. The magnitude indicates the power of ten by which to multiply the corresponding value. If the value of the committed burst size can be fully accommodated in the value octets described above (octets 23 and 24), neither octet 29 nor octet 30 are included. |
| 30 | Bits 1–3 are the outgoing committed burst size magnitude and bits 4–6 are the incoming committed burst size magnitude. Bit 7 is unused and bit 8 is 1. |
| 31 | 0 × 10, Excess burst size magnitude field identifier. The magnitude indicates the power of ten by which to multiply the corresponding value. If the value of the excess burst size can be fully accommodated in the value fields described above (octets 25 and 26), neither octet 29 nor octet 30 are included. |
| 32 | Bits 1–3 are the outgoing excess burst size magnitude and bits 4–6 are the incoming excess burst size magnitude. Bit 7 is unused and bit 8 is 1. |

Full status messages are conventional frame relay LMI full status messages, with bit 7 of the 5$^{th}$ octet changed to a value of 1 if Quality of Service parameters for the virtual circuit have changed. All other octets are unchanged from their conventional values.

What is claimed is:

1. A network equipment device capable of communicating information through a network, comprising:

a Quality of Service storage having an input for receiving at least one Quality of Service parameter, the Quality of Service storage for storing and providing at an output at least one of the at least one Quality of Service parameters stored;

a status provider having a first input coupled to the Quality of Service storage output for receiving at least one of the at least one Quality of Service parameter, the status provider for providing at an output at least one of the at least one Quality of Service parameter received at the status provider input; and a communication interface having an input coupled to the status provider output for receiving the at least one Quality of Service parameter, the communication interface for providing at an input/output coupled to at least one user equipment device at least one of the at least one Quality of Service parameter received at the communication interface.

2. The network equipment device of claim 1, wherein the network equipment device supports frame relay LMI.

3. The network equipment device of claim 2:

wherein the communication interface is additionally for receiving a command at the communication interface input/output and providing at an output a command corresponding to the command received at the communication interface input/output;

wherein the status provider provides the at least one Quality of Service parameter responsive to a second input; and the network equipment device additionally comprises a status request receiver having an input coupled to the communication interface output for receiving at least one request to provide at least one Quality of Service parameter, the status request receiver for signaling at an output coupled to the status provider second input responsive to the request received at the status request receiver input.

4. The network equipment device of claim 2 additionally comprising:

a status changer having an input operatively coupled for receiving at least one Quality of Service parameter, the status changer for providing at a first output coupled to the Quality of Service storage input at least one of the at least one Quality of Service parameter received at the status changer input, and for signaling at a second output responsive to the at least one Quality of Service parameter received at the status changer input; and a status change provider having an input coupled to the status changer second output, the status change provider for providing a status change message at an output coupled to the communication interface input responsive to the status change provider input.

5. The network equipment device of claim 2, additionally comprising a version negotiator for storing and providing at an output coupled to the communication interface input at least one indication of a protocol capable of being used for communication by the network equipment device.

6. A user equipment device for providing information to a network coupled to the user equipment device, the user equipment device comprising:

a communications interface having a first input operatively coupled for receiving the information intended for communication over the network, and a second input operatively coupled for receiving information intended for a network equipment device, the communication interface for providing at an input/output coupled to the network the information received at the communication interface first and second inputs, for receiving information from the network and information comprising at least one Quality of Service parameter from the network equipment device at the input/output and for providing at an output information received at the communication interface input/output;

a Quality of Service status receiver having an input coupled to the communication interface output for receiving at least one of the at least one Quality of Service parameter, the Quality of Service status receiver for providing at an output at least one of the at least one Quality of Service parameter received at the Quality of Service status receiver input; and a Quality of Service status storage having an input coupled to the Quality of Service status receiver output, the Quality of Service status storage for storing and providing at an output the at least one Quality of Service parameter received at the Quality of Service status storage input.

7. The user equipment device of claim 6, wherein the user equipment device supports frame relay LMI.

8. The user equipment device of claim 7, additionally comprising a Quality of Service status requester for providing at an output coupled to the communication interface second input at least one request for at least one Quality of Service parameter.

9. The user equipment device of claim 7 additionally comprising:

a version negotiator for providing at a first output coupled to the communication interface second input a request from the network equipment device for protocol information, for receiving at an input a response comprising a protocol indicator to the request provided at the output, and for signaling at a second output responsive to the protocol indicator received at the version negotiator first input in a set of protocol indicators.

10. The user equipment device of claim 7 wherein the information received at the communication interface input/output comprises status change information, the user equipment device additionally comprising:

a status change detector having an input coupled to the communication interface output for receiving a message indicating the at least one Quality of Service parameter stored in the Quality of Service status storage is incorrect, and for signaling at an output responsive to the input; and a Quality of Service status requester having an input coupled to the status change detector output, the Quality of Service status requester for providing at an output a request for at least one Quality of Service parameter responsive to the Quality of Service status requester input.

11. A method of receiving at least one Quality of Service parameter, comprising:

providing from a user equipment device to a network equipment device a request for the at least one Quality of Service parameter;

receiving from the network equipment device at the user equipment device the at least one Quality of Service parameter requested; and storing the at least one Quality of Service parameter received.

12. The method of claim 11 wherein the user equipment device supports frame relay LMI.

13. The method of claim 12 additionally comprising routing information responsive to the at least one Quality of Service parameter stored.

14. The method of claim 13 additionally comprising the steps of:

providing from the user equipment device a request for at least one management interface protocol; and responsive to the providing the request for the management interface protocol step, receiving an identifier of at least one management interface protocol corresponding to at least one management interface protocol capable of use for communication with the network equipment device.

15. The method of claim 14, wherein the providing the request for the at least one Quality of Service parameter step is responsive to the receiving the identifier of the at least one management interface protocol step.

16. The method of claim 15 comprising the additional steps of:

selecting at least one management interface protocol identifier from the at least one management interface protocol identifier received; and providing the at least one management interface protocol identifier selected to indicate at least one protocol for communication.

17. The method of claim 14, comprising the additional step of identifying an establishment of a connection with network equipment device and wherein at least one of the other steps is responsive to the identifying step.

18. The method of claim 12, comprising the additional steps of:

receiving a message indicating a change in status of the network equipment device; and repeating at least one of the steps of claim 11.

19. A method of providing at least one Quality of Service parameter, comprising:

at network equipment device, receiving a request for the at least one Quality of Service parameter from at least one user equipment device; and providing from network equipment device to at least one user equipment device at least one of the at least one Quality of Service parameter requested.

20. The method of claim 19, wherein the network equipment device supports frame relay LMI.

21. The method of claim 20, comprising the additional steps of:

receiving a request from the user equipment device for at least one identifier corresponding to at least one management interface protocol; and responsive to the receiving the request for the at least one identifier corresponding to the at least one management interface protocol step, providing at least one identifier of a management interface protocol capable of use by the network equipment device.

22. The method of claim 21 comprising the additional steps of:

receiving an identifier of a protocol; and communicating with the user equipment device using the protocol corresponding to the identifier received.

23. The method of claim 21, additionally comprising the steps of:

identifying a change in status related to the network equipment device; and providing to the user equipment device a status change message responsive to the identifying step.

24. A computer program product comprising a computer useable medium having computer readable program code embodied therein for receiving at least one Quality of Service parameter, the computer program product comprising:

computer readable program code devices configured to cause a computer to provide from a user equipment device to a network equipment device a request for the at least one Quality of Service;

computer readable program code devices configured to cause a computer to receive from the network equipment device at the user equipment device the at least one Quality of Service parameter requested; and computer readable program code devices configured to cause a computer to store the at least one Quality of Service parameter received.

25. The computer program product of claim 24, wherein the user equipment device supports frame relay LMI.

26. The computer program product of claim 25 additionally comprising computer readable program code devices configured to cause a computer to route information responsive to the at least one Quality of Service parameter stored.

27. The computer program product of claim 26 additionally comprising:
   computer readable program code devices configured to cause a computer to provide from the user equipment device a request for at least one management interface protocol; and
   computer readable program code devices configured to cause a computer to, responsive to the computer readable program code devices configured to cause a computer to provide the request for the management interface protocol, receive an identifier of at least one management interface protocol corresponding to at least one management interface protocol capable of use for communication with the network equipment device.

28. The computer program product of claim 27, wherein the computer readable program code devices configured to cause a computer to provide the request for the at least one Quality of Service parameter step are responsive to the computer readable program code devices configured to cause a computer to receive the identifier of the at least one management interface protocol.

29. The computer program product of claim 28, additionally comprising:
   computer readable program code devices configured to cause a computer to select at least one management interface protocol identifier from the at least one management interface protocol identifier received; and
   computer readable program code devices configured to cause a computer to provide the at least one management interface protocol identifier selected to indicate at least one protocol for communication.

30. The computer program product of claim 27, additionally comprising computer readable program code devices configured to cause a computer to identify an establishment of a connection with network equipment device and wherein at least one of the other computer readable program code devices are responsive to the computer readable program code devices configured to cause a computer to identify.

31. The computer program product of claim 25, additionally comprising:
   computer readable program code devices configured to cause a computer to receive a message indicating a change in status of the network equipment device; and
   computer readable program code devices configured to cause a computer to repeat the operation of at least one of the computer readable program code devices of claim 24.

32. A computer program product comprising a computer useable medium having computer readable program code embodied therein for providing at least one Quality of Service parameter, the computer program product comprising:
   computer readable program code devices configured to cause a computer to, at network equipment device, receive a request for the at least one Quality of Service parameter from a user equipment device; and
   computer readable program code devices configured to cause a computer to provide from a network equipment device to a user equipment device at least one of the at least one Quality of Service parameter requested.

33. The computer program product of claim 32, wherein the network equipment device supports frame relay LMI.

34. The computer program product of claim 33, additionally comprising:
   computer readable program code devices configured to cause a computer to receive a request from the user equipment device for at least one identifier corresponding to at least one management interface protocol; and
   computer readable program code devices configured to cause a computer to, responsive to the computer readable program code devices configured to cause a computer to receive the request for the at least one identifier corresponding to the at least one management interface protocol, provide at least one identifier of a management interface protocol capable of use by the network equipment device.

35. The computer program product of claim 34, additionally comprising:
   computer readable program code devices configured to cause a computer to receive an identifier of a protocol; and
   computer readable program code devices configured to cause a computer to communicate with the user equipment device using the protocol corresponding to the identifier received.

36. The computer program product of claim 34, additionally comprising:
   computer readable program code devices configured to cause a computer to identify a change in status related to the network equipment device; and
   computer readable program code devices configured to cause a computer to provide to the user equipment device a status change message responsive to the computer readable program code devices configured to cause a computer to identify.

37. A system for receiving at least one Quality of Service parameter, comprising:
   means for providing from a user equipment device to a network equipment device a request for the at least one Quality of Service parameter; and
   means for receiving from the network equipment device at the user equipment device the at least one Quality of Service parameter requested.

* * * * *